United States Patent [19]
Farr

[11] 4,422,695
[45] Dec. 27, 1983

[54] ANTI-SKID BRAKING SYSTEM FOR VEHICLES

[75] Inventor: Glyn Phillip R. Farr, Wootton, England

[73] Assignee: Lucas Industries Limited, Birmingham, England

[21] Appl. No.: 337,760

[22] Filed: Jan. 7, 1982

[30] Foreign Application Priority Data

| Jan. 14, 1981 | [GB] | United Kingdom | 8101108 |
| May 12, 1981 | [GB] | United Kingdom | 8114404 |
| May 12, 1981 | [GB] | United Kingdom | 8114405 |
| May 21, 1981 | [GB] | United Kingdom | 8115716 |
| Sep. 11, 1981 | [GB] | United Kingdom | 8127546 |

[51] Int. Cl.³ .............................................. B60T 8/02
[52] U.S. Cl. ..................................... 303/115; 303/116
[58] Field of Search ............... 303/115, 116, 117, 119, 303/113, 61–63, 68–69, 10–12, 114, 118; 188/181 A, 181 R, 181 C, 181 T

[56] References Cited

U.S. PATENT DOCUMENTS

| 3,724,914 | 4/1973 | Skoyles | 303/116 |
| 3,731,980 | 5/1973 | Fink et al. | 303/119 |
| 4,179,166 | 12/1979 | Sharp et al. | 303/116 X |
| 4,350,396 | 9/1982 | Mortlmer | 303/115 |

*Primary Examiner*—Douglas C. Butler

*Attorney, Agent, or Firm*—Scrivener, Clarke, Scrivener and Johnson

[57] ABSTRACT

An anti-skid hydraulic braking system for a vehicle includes a modulator which in response to a skid signal at a skid point is operative to relieve the brake-applying pressure at a braked wheel by displacing fluid from the brake. The modulator includes a brake-application restrictor which is operative to control the rate at which the brake-applying pressure from a source can be re-applied to the brake at the cessation of the skid signal, and a valve assembly is incorporated to by-pass the re-application restrictor. The valve assembly comprising first and second valve members which are relatively movable between a spaced inoperative position in which unrestricted communication is provided between the source and the brake and an operative position in which the valve members are urged into engagement to render the restrictor effective. The first valve member is urged into engagement with the second valve member in response to the skid signal, and the second valve member is urged into engagement with the first valve member in response to any difference in fluid pressure acting across the restrictor. The restrictor will remain established until the difference in fluid pressure is reduced to a value at which the pressure from the source and the pressure applied to the brake are substantially equal. There is therefore no possibility of unrestricted communication between the source and the brake being established prematurely.

6 Claims, 4 Drawing Figures

ANTI-SKID BRAKING SYSTEM FOR VEHICLES

This invention relates to anti-skid hydraulic braking systems for vehicles of the kind which include a modulator which in response to a skid signal at a skid point is operative to relieve the brake-applying pressure at a braked wheel by displacing fluid from the brake, the modulator including a brake-application restrictor which is operative to control the rate at which the brake-applying pressure from a source can be re-applied to the brake at the cessation of the skid signal.

In some known anti-skid hydraulic braking systems a pump is operative to return fluid displaced from the brake to a line between the source and the modulator on the upstream side of the restrictor, and the restrictor is rendered inoperative when all the fluid displaced from the brake has been returned to the modulator, irrespective of the difference in fluid pressure acting across the restrictor at that time. If the difference in fluid pressure is substantial when the restrictor is rendered inoperative, then pressure will then be applied to the brake at an uncontrolled rate and could lead to a severe skid.

According to our invention in an anti-skid braking system of the kind set forth a valve assembly is incorporated to by-pass the re-application restrictor, the valve assembly comprising first and second valve members which are relatively movable between a spaced inoperative position in which unrestricted communication is provided between the source and the brake and an operative position in which the valve members are urged into engagement to render the restrictor effective, the first valve member being urged into engagement with the second valve member in response to the skid signal, and the second valve member being urged into engagement with the first valve member in response to any difference in fluid pressure acting across the restriction.

Any difference in fluid pressure acting across the restriction will ensure that, at the cessation of a skid signal, the brake-applying pressure is re-applied at a rate controlled by the restriction, and the restriction will remain established until the difference in fluid pressure is reduced to a value at which the pressure from the source and the pressure applied to the brake are substantially equal.

There is therefore no possibility of unrestricted communication between the source and the brake being established prematurely.

The restriction may be defined between interengaging parts of the first and second valve members. For example, the first valve member may include a valve head which is engageable with a seating on the second valve member, and the seating is provided with diametral scratch or slight notch which defines the restriction when the head is in engagement with the seating.

One embodiment of our invention is illustrated in the accompanying drawings in which.

Figure 1:
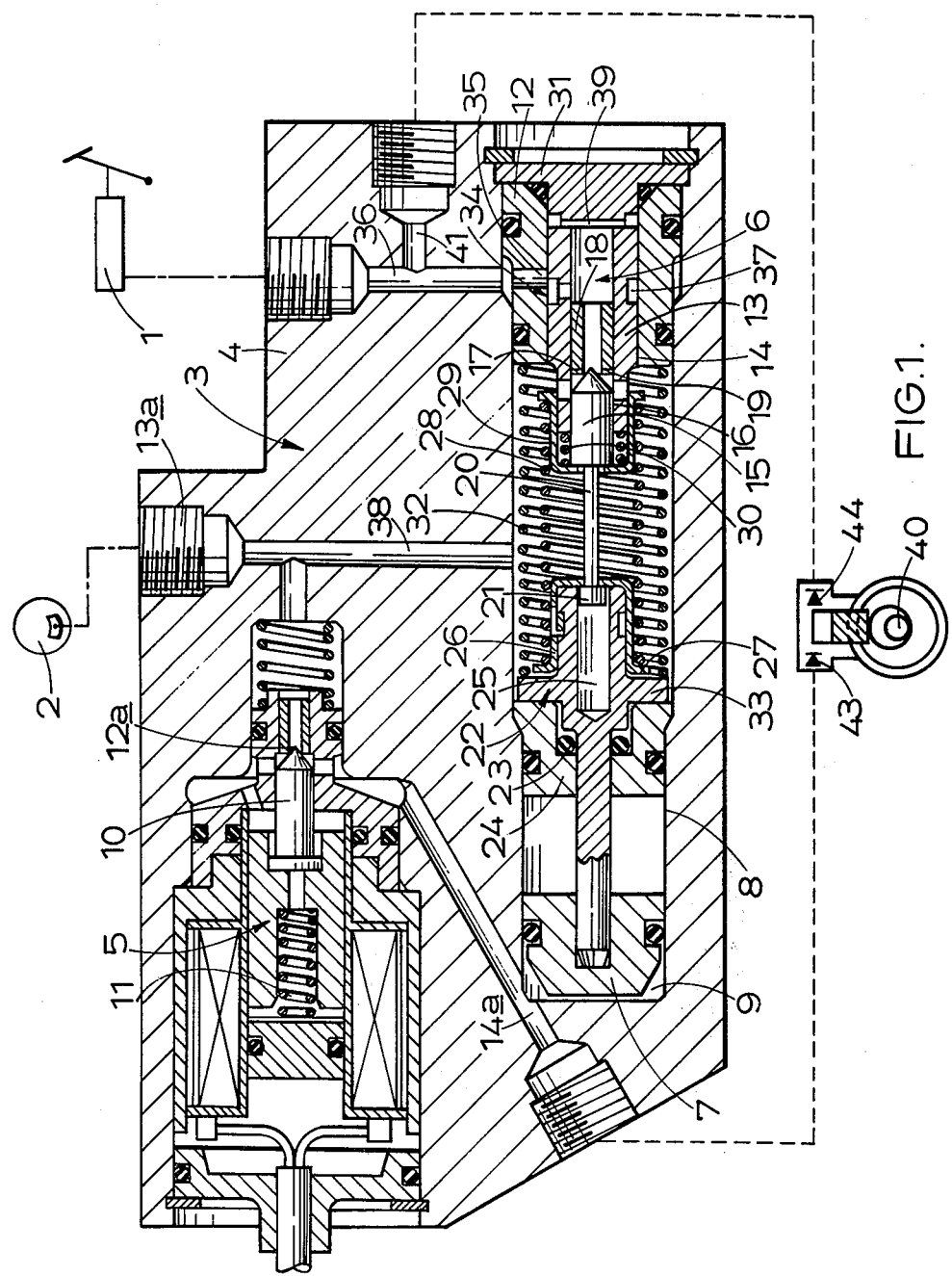
FIG. 1 is a layout of an anti-skid hydraulic braking system of a vehicle.

The anti-skid hydraulic braking system illustrated in FIG. 1 of the drawings comprises a pedal-operated hydraulic master cylinder 1 for operating a wheel brake 2, and fluid pressure from the master cylinder 1 is applied to the brake 2 through a modulator 3.

The modulator 3 comprises a housing 4 in which a solenoid-operated pressure dump valve 5, a flow-control regulator valve 6, and an expander piston 7 working in a bore portion 8 which defines a dump chamber 9.

The dump valve 5 comprises a valve head 10 which is normally urged by a spring 11 into engagement with a seating 12a in order to cut-off communication between an outlet port 13a connected to the brake 2 and a dump passage 14a which leads to the dump chamber 9.

The valve 6 is housed in one end of a stepped longitudinally extending bore 11 in the housing 4 of which the opposite end, which is of smallest diameter, defines the bore portion 8 which forms the dump chamber 9. The valve 6 comprises a sleeve 12 of differential outline of which the two portions are sealingly housed in the portions of bore 11 which are of greatest and of intermediate diameter, a hollow spool 13 working in the bore 14 of the sleeve 12, and a valve head 15 of cone-shaped outline slidably guided in the bore 16 of the spool 13 for engagement with a seating 17 defined by the adjacent end of a member 18 which is housed in the bore 16. The seating 17 is provided with a diametrical scratch or slight notch 19 which defines between the head 15 and the seating 17 a first restriction of fixed area when the head 15 is in engagement with the seating 17. The head 15 is carried at one end of a stem 20 of reduced diameter of which the opposite end carries an enlarged head 21.

A force-transmitting member 22 is guided to slide through a seal 23 in a partition 24 which is received in the portion 8 of the bore 11 which is of smallest diameter. The expander piston 7 acts on one end of the member 22 and the opposite end disposed in the opposite side of the partition 24 is provided with a longitudinally extending bore 25 in which the head 21 is slidably received. The head 21 is retained within the bore 25 by means of a retainer 26 of top-hat outline. A flange 27 on the retainer forms an abutment for one end of a compression spring 28 which surrounds the stem 20 and of which the opposite end is in abutment with a thimble 29 which, in turn, abuts against the adjacent end of the head 15. A light spring 30 is positioned between the spool 13 and the thimble 29 to urge the spool 13 against a stop 31 at the adjacent end of the bore 11. A further compression spring 32 acts between the sleeve 12, and a radial flange 33 on the force-transmitting member 22. The spring 32 acts to hold the sleeve 12 against the stop 31 at the end of the bore 11 and, in conjunction with the forces in the springs 28 and 30, act to urge the flange 33 into engagement with the partition 24, in turn to define a retracted position for the expander piston 7 in which the volume of the dump chamber 9 is at a minimum. The relative lengths of the stem 20 and the head 15 are chosen such that, in this inoperative retracted position shown, the head 15 is spaced from the seating 17.

A second restriction 34 of variable area is defined in the valve 6 by a radial port 35 in the sleeve 12 which is in permanent communication with the master cylinder 1 through a passage 36 in the housing 4 and an annular recess 37 in the spool 13 which meters flow through the port 35 and into a radial port in the spool 13 in accordance with the position of the spool 13 within the bore of the sleeve 12. In the restricted position shown, the restriction 34 is in a maximum open position to permit an unrestricted flow of fluid from the master cylinder 1 to the outlet port 13, through the unrestricted space between the head 15 and the seating 17 and through the intermediate portion of the bore 11 and a communicating passage 38 in the housing 4. The stop 31 is provided with a diametrical or other slot 39 to enable fluid pressure within the bore of the spool 13 to act on the end of the spool 13 which is of greatest area.

A scavenger pump 40 is connected between the end of the dump passage 14 which is remote from the dump valve 5 and a recirculation passage 41 which opens into a brake-line comprising the passage 36 between the master cylinder 1 and the port 35. When the pump 40 is operating it is operative to withdraw fluid from the dump chamber 9 and pump it to the passage 36 on the upstream side of the valve 6.

The pump 40 is provided on its suction and delivery sides with oppositely acting one-way valves 43 and 44 respectively.

In a normal inoperative brake-applying position all the components are disposed in the relative positions shown in the drawing with the solenoid-operated valve closed, and the flow-control regulator valve 6 and the pump 40 both inoperative.

Upon operation of the master cylinder 1 the brake 2 is applied by the supply of hydraulic fluid under pressure through the brake-line 36 and the valve 6 to the outlet port 13 as described above. In this condition the valve 6 is inoperative. Reverse-flow through the recirculation passage 41 is prevented by the one-way valve 44.

The wheel braked by the brake 2 is provided with skid sensing means which, at a skid point at which a skid occurs at the braked wheel, is operative to generate a skid signal to energise the solenoid of the solenoid-operated valve 5 in order to withdraw the head 10 from the seating 12a. Fluid supplied to the brakd 2 is dumped to the dump chamber 9 and acts on the expander piston 7. When the pressure of the fluid is sufficient to overcome the loading in the springs 30 and 32 the piston 7 moves inwardly of the bore 11 to increase the effective volume of the dump chamber 9 thereby to relieve the pressure applied to the brake 2. Initial movement of the piston 7 in this inward direction causes the head 15 to engage with its seating 17 such that the slot 19 defines the first restriction of fixed area. Thereafter further movement of the piston 7 against the combined loading of the springs 28 and 32 has the effect of increasing the load of the spring 28 which determines the force with which the spool 13 is urged into engagement with, or towards, the stop 31.

Since the master cylinder 1 is still being operated some fluid will flow directly from the master cylinder 1 to the dump chamber 9 when the dump valve 5 opens but, upon engagement of the head 15 with the seating 17 to define the first restriction, a pressure drop occurs across the first restriction. Thus the spool 13 is subjected to a net force which is operative to tend to urge the spool 13 away from the stop 31 in order to reduce the effective area of the second restriction and, in turn, to regulate the rate of flow through the valve 6 to a predetermined constant value for a given loading of the spring 28. In other words the spool 13 adopts an equilibrium position in which the resultant force acting on the spool 13 to urge it away from the stop 31 is balanced by the force in the spring 28.

At the same time as the solenoid is first energised the scavenger pump 40 starts to operate. The scavenger pump 40 can be driven electrically by an electric motor, or it can be provided with a disabler of which the effect is overcome by the pressure of fluid in the dump chamber 9 which acts to cause a pump plunger of the pump 40 to co-operate with a rotating eccentric drive. In the latter construction, the drive can be driven continuously, for example from the crank-shaft of the prime mover of the vehicle.

The scavenger pump 40 returns fluid from the dump chamber 9 to the brake-line 36 through the connection 41.

The output of the pump 40 exceeds the flow through the flow-regulator valve 6. Thus once the dump chamber 9 has absorbed the volume of fluid returned from the brake, the expander piston 7 will start to move back to its original retracted position in which the volume of the dump chamber 9 is at a minimum. Whether or not the expander piston 7 reaches the fully retracted position before the dump valve 5 closes to isolate the brake 2 from the dump chamber 9 will depend upon the duration of the skid signal. The position of the expander piston 7, when the dump valve 5 closes determines the loading of the spring 28, the rate of flow through the valve 6, and hence the rate at which the brake 2 can be re-applied. However, we also arrange for the pump 40 to continue to run for a predetermined interval following closure of the valve 5 for the purpose to be described later.

The initial rate at which the brake will be re-applied automatically in a single cycle and following correction of a skid is determined by:

1. The length of time between the dump valve 5 opening and closing; and
2. The volume of fluid withdrawn from the brake 2.

On a surface having a relatively high coefficient of friction a high brake pressure can be developed during normal braking, and a large amount of strain energy is stored in the brake housing. The relief of such energy in response to the skid signal acts to augment the capacity of the dump chamber 9 and, due to the relatively high master cylinder pressure having to be relieved, the expander piston 7 is moved a considerable distance down the bore 11 when the dump valve 5 opens. This applies a high pre-load to the spring 28, in turn to provide the valve 6 with a correspondingly high flow rate setting. Assuming therefore that the skid signal is of short duration and the pump 40 has withdrawn only a relatively small volume of fluid from the dump chamber 9 then, at the cessation of the skid signal, the pre-load in the spring 28 is substantially the same and the high flow rate setting of the valve 6 will cause the brake pressure to build up again relatively quickly. But since the pump 40 is still operating to withdraw fluid from the dump chamber 9 after the valve 5 has closed, the pre-load in the spring 28 is gradually reduced during such re-application. This reduces the flow rate setting of the valve 6 and reduces the rate of re-application of the brake 2, towards the end of the re-application stage until, finally, the effective volume of the chamber 9 is reduced to its minimum value which enables the valve head 15 to move away from the seating 19. This renders the valve 6 again inoperative so that the master cylinder is connected directly to the brake 2 without restriction.

The longer the delay between the valve 5 opening and closing, the greater will be the volume of fluid withdrawn from the chamber 9 and returned to the brakeline 42 in that period and the lower will be the loading in the spring 28 and hence the setting of the flow control valve 6. A long delay would be consistent with a surface having a low co-efficient of friction, and vice versa.

Conversely if the brake 2 is applied when the vehicle is on a surface having a relatively low coefficient of friction and a skid signal is received, the expander piston 8 moves only a relatively small distance to relieve the applied pressure and render the flow control valve 6 operative. Thus the flow control valve 6 will have a very low flow setting and, in consequence, the rate at which the brake can be re-applied in that cycle will be at its lowest.

When the pump 40 is driven electrically a position sensing switch is incorporated to switch off the pump motor after a predetermined time following closure of the dump valve 5.

As illustrated, when the pump 40 is operated from a shaft driven by the prime mover of wheel(s) of the vehicle, the pump will sense automatically when the expander piston 7 has returned to its original position in which no further fluid is present in the dump chamber 9. When the pump is driven from a variable speed power supply, a flow control device is preferably associated with the pump to provide a substantially constant output.

When the expander piston 7 has been returned to its fully retracted position before the dump valve closes, as may occur when a skid signal is produced with the brakes applied on an extremely slippery surface, the pressure between the passage 36 and the brake 2 acts to apply a net force to the spool 13 urging it away from the stop 31 and holding it against the head 15 to give the lowest rate of re-application. Since the pressure difference is maintained whilst the skid signal is operative, the head 15 is firmly held in engagement with the seating to define the first restriction under such conditions. A pressure difference of only two atmospheres is required to hold the head 15 against the seating 17.

Figure 2:
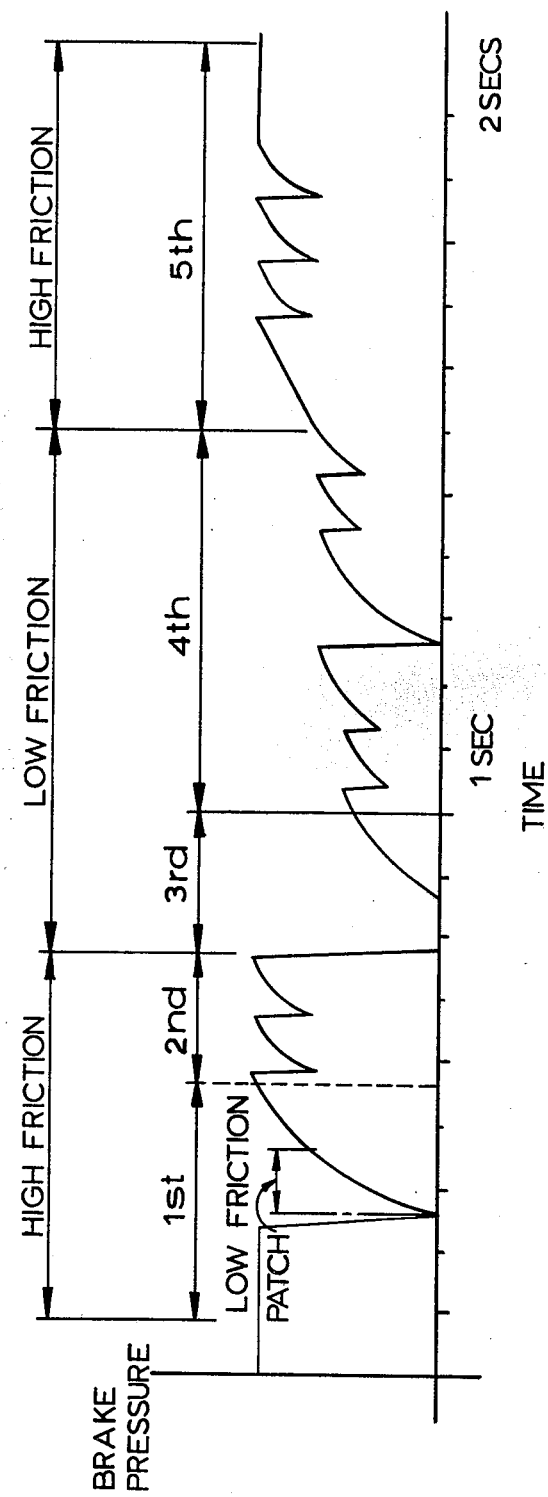
FIG. 2 is a graph of modulated brake pressures plotted against time.

FIG. 2 is a graph of brake pressure plotted against time.

As shown in the graph, the vehicle is initially braked on a dry road but passes over a low friction patch, e.g. a manhole cover, and then back onto a dry road. As the wheel re-acceleration is high on the dry road the dump valve 5 opens and closes quickly but the expander piston 7 has moved well into the bore 11 to ensure the brake 2 is relieved. The flow control valve 6 is, therefore, highly loaded by the spring 28 and the initial brake re-application rate is fast. However, as the pump 40 withdraws the fluid, the flow rate decreases as shown by the graph.

The second stage assumes the driver has increased the master cylinder pressure during the first stage so a series of skid signals are received on the dry surface. In this case the expander piston 7 only needs to move a small distance to reduce the brake pressure slightly before the wheel accelerates and so the brake re-application rate is slow.

The third stage assumes the vehicle passes onto a low friction surface and the brakes are fully relieved, driving the expander piston 7 fully towards the stop 31. However, as the road surface friction is low it takes some time for the wheel to accelerate and close the dump valve 6 so that the expander piston 7 has been allowed to return. When the dump valve 6 closes the brakes are re-applied slowly.

The fourth stage shows the re-apply on the slippery surface with re-apply at its slowest rate i.e. small movements of the expander piston 7, to release the brake and partial return due to slow wheel acceleration. The central dip shows another, more slippery, patch.

The fifth stage assumes that the vehicle passes once more onto a dry surface and in this case the first re-application will be slow. However, subsequent signals will be as shown in the second stage.

Figure 3:
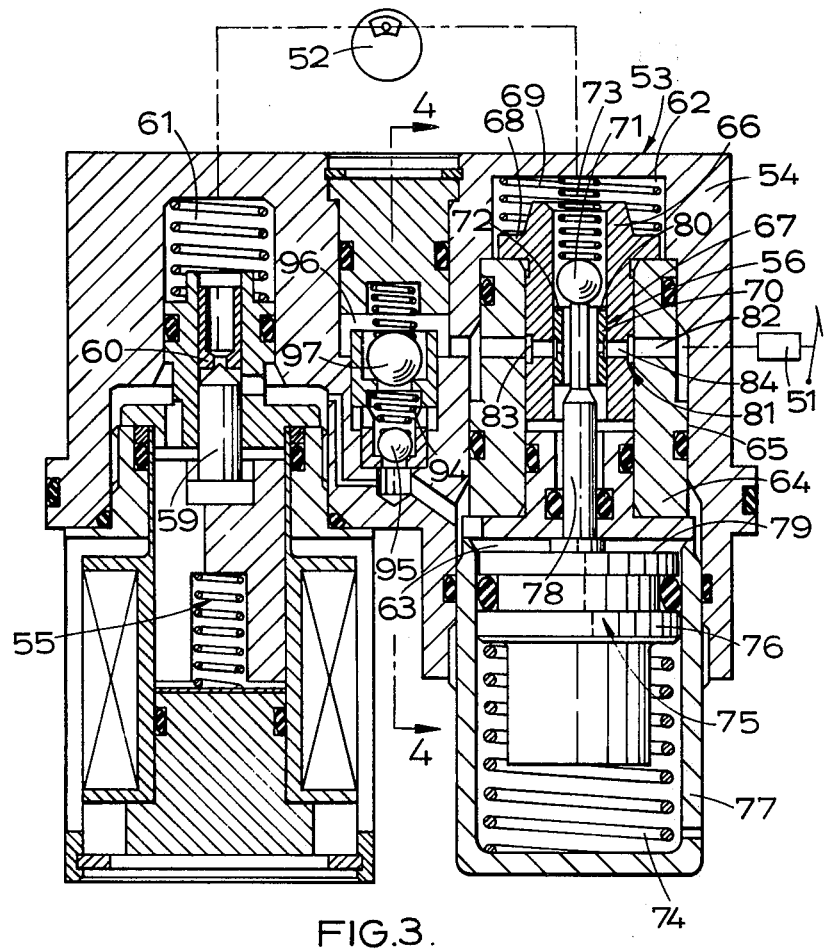
FIG. 3 is a layout of another anti-skid hydraulic braking system for a vehicle including a section on the line 3—3 of FIG. 4.
Figure 4:
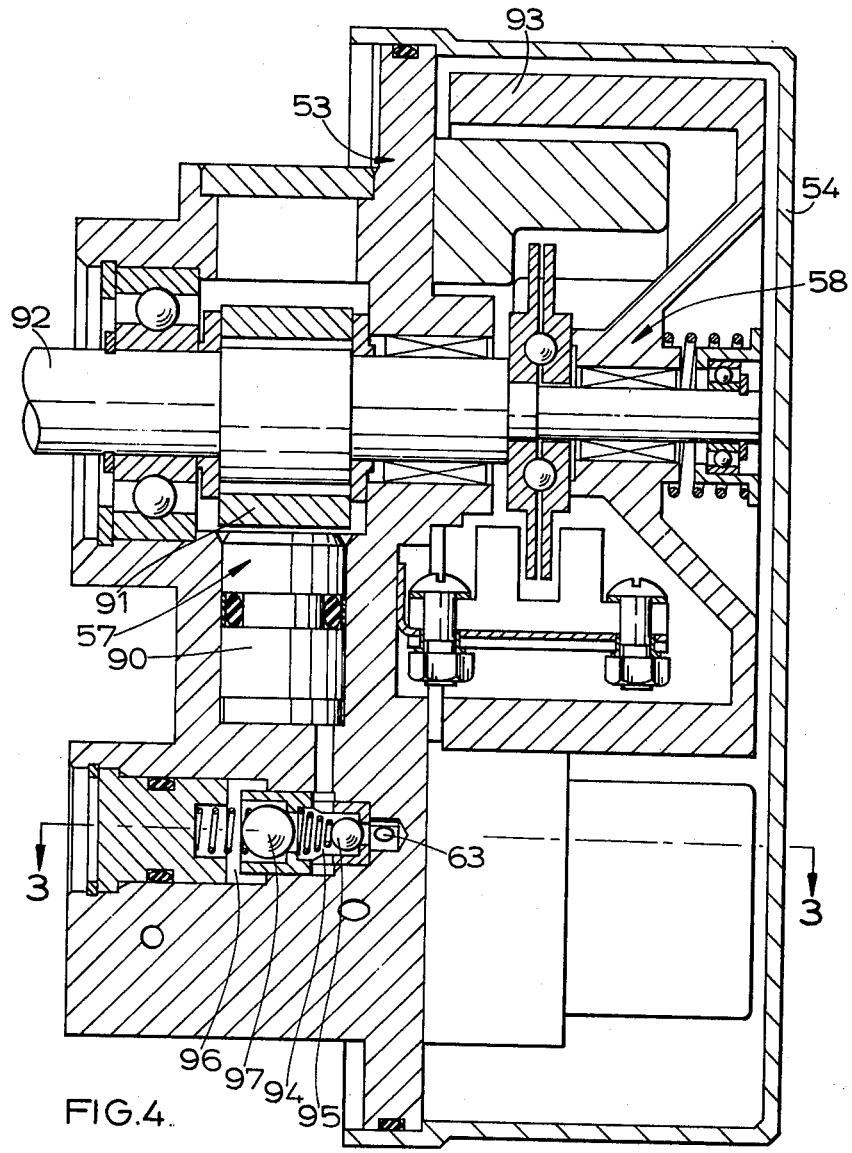
FIG. 4 is a section on the line 4—4 of FIG. 3.

The anti-skid braking system illustrated in FIGS. 3 and 4 of the drawings comprises a pedal-operated hydraulic master cylinder 51 for operating a wheel brake 52, and a modulator 53 through which fluid is supplied from the master cylinder 51 to the brake 52.

The modulator comprises a housing 54 in which is incorporated a solenoid-operated pressure dump valve 55, a flow control regulator valve 56, a pump 57, and a skid sensing mechanism 58 for producing an electrical skid signal to energise the solenoid of the valve 55.

The dump valve 55 comprises a valve head 59 which normally engages with a seating 60 to isolate interconnected brake outlet chambers 61 and 62 from a dump chamber 63.

The regulator valve 56 comprises a sleeve 64 of differential outline of which the two portions are sealingly housed in portions of a bore 65, a hollow spool 66 working in the bore 67 of the sleeve 64 and having a flange 68 disposed within the chamber 62 and urged into engagement with the sleeve 64 by means of a spring 69, a hollow insert 70 fast in the bore of the spool 66, a valve member 71 in the chamber 62 and comprising a ball which is urged towards a seating 72 at the adjacent end of the insert 70 by means of a spring 73, and a second spring 74 which is stronger than the first spring 73 and acts on the piston 75 normally to urge the ball 71 away from the seating 72. The second spring 74 acts on the ball 71 through a stepped piston 75. The stepped piston 75 has a portion 76 of greater diameter which works in the bore of a cylindrical housing 77 projecting from the portion of the bore 65 which is of greatest diameter, and a portion 78 of smaller diameter which works through a complementary bore portion and, at its free end which is of reduced diameter, extends through the insert 70 to engage with the ball 71.

One wall of the dump chamber 63 is defined by a shoulder 79 at the step between the two portions 26 and 78.

The seating 72 is provided with a diametral scratch or slight notch 80 which defines between the ball 71 and the seating 72 a first restriction of fixed area, at least when the ball 71 is in engagement with the seating 72.

A second restriction 81 of variable area is defined in the valve 56 by a radial port 82 in the sleeve 64 which is in permanent communication with the master cylinder 51 and an annular recess 83 in the spool 66 which meters flow through the port 82 and into a radial port 84 in the spool 66 in accordance with the position of the spool 66 within the bore 67 of the sleeve 64. In the retracted position shown in the drawing the restriction 81 is in a maximum open position to permit an unrestricted flow from the master cylinder 51 to the brake 52, through the unrestricted space between the ball 71 and the seating 72 and the chamber 62.

The pump 57 comprises a plunger 90 which is normally disabled from an eccentric 91 on a drive shaft 92 for the wheel, and the skid sensing means 58 comprises a flywheel mechanism 93 which is mounted on the shaft 92.

The pump 57 is adapted to draw fluid from the dump chamber 63 and into a pumping space 94 through a first one-way valve 95, and to discharge fluid into a chamber 96 in communication with the port 82, through a second one-way valve 97.

In the normal inoperative brake-applying position all the components are disposed in the relative positions shown in the drawings with the solenoid-operated valve 55 closed, and the flow regulator valve 56 and the pump 57 both inoperative.

Upon operation of the master cylinder 51 the brake 52 is applied by the supply of hydraulic fluid through the chamber 62, and the fluid is also trapped in the chamber 96 by the one-way valve 97, and the chamber 61 by the dump valve 55. The master cylinder pressure also acts on the end of the portion 78 of the piston 75 but is unable to overcome the force in the spring 74 which is chosen to be able to support the full (maximum required) pressure from the master cylinder 1 which is required to achieve optimum braking on an optimum surface, for example 2000 p.s.i., without the ball 71 engaging with the seating 72.

When a skid condition is sensed at the braked wheel an electrical signal generated by the skid sensing means 58 energises the solenoid of the valve 55. This opens the valve 55 to dump pressure from the brake 52 to the dump chamber 63 where it acts on the face 79 of the piston 75 and also upon the plunger 90 by passage through the one-way valve 95.

The piston 75 is therefore subjected over its total area to the pressure applied to the brake 52. This overcomes the force in the spring 74 with the result that the piston 75 moves relatively away from the seating 72 to permit the ball 71 to engage with the seating 72 but the scratch or notch 80 permits a small restricted flow to continue. The pressure differential across the scratch causes the spool 66 to move relatively into the chamber 62 carrying the ball 71 with it against the force in the springs 69 and 73.

The load in the spring 74, when the piston 75 is fully retracted, is such as to limit the pressure in the dump chamber 63 to a pressure of say 50 p.s.i.

When the one-way valve 95 opens the pressure urges the plunger 90 into engagement with the drive 91 so that fluid is pumped through the one-way valve 97 and into the passage 82 from whence it returns to the dump chamber 63 whilst the dump valve 55 is open, by way of the flow control regulator valve 56 and the chambers 61 and 62.

When the skid has been corrected, the solenoid valve 56 closes again to isolate the chambers 61 and 62 from the dump chamber 63 and the valve 56 continues to meter the supply of fluid to the brake 52 through the restriction 80 until the differential between the brake pressure and the master cylinder pressure falls to a level at which the spring 69 is able to push the flange 68 of the spool 66 back into abutting engagement with the sleeve 64.

The output from the pump 57 normally exceeds the restricted flow through the regulator valve 56. Thus once the dump chamber 63 has absorbed the fluid returned from the brake 52, the piston 75 will start to move back towards its original position.

Should the piston 75 regain its original position before the rising brake pressure reaches the level of the master cylinder pressure, the ball 71 will not be immediately unseated since the spool 66, and hence the ball 71 will still be in the advanced position described above. Thus under these circumstances, the ball 71 will only be separated from the seat 72 when the spring 69 urges the flange 68 of spool 66 back into engagement with the sleeve 64.

If the spool 66 regains its original position before all the fluid has been returned from the dump chamber 63, the valve 71 will be unseated when the piston 75 regains its original position.

Once the piston 75 regains its original position the pump piston is no longer urged towards the eccentric drive and the pump piston remains at T.D.C.

I claim:

1. An anti-skid hydraulic braking system for vehicles comprising a wheel, a brake for braking said wheel, a source of brake-applying pressure for applying said brake, means for sensing skid conditions at said wheel at a skid point during braking and for producing a skid signal at said skid point, and a modulator responsive to said skid signal to relieve said brake-applying pressure by displacing fluid from said brake, said modulator including a brake-reapplication restrictor which is operative to control the rate at which said brake-applying pressure from said source can be re-applied to said brake at the cessation of said skid signal, wherein a valve assembly is incorporated to by-pass said reapplication restrictor, said valve assembly comprising first and second valve members which are relatively movable between a spaced inoperative position in which unrestricted communication is provided between said source and said brake and an operative position in which said valve members are urged into engagement to render said restrictor operative, means for urging said first valve member into engagement with said second valve member in response to said skid signal, and means for urging said second valve member into engagement with said first valve member in response to any difference in fluid pressure acting across restrictor.

2. A braking system as claimed in claim 1, wherein said restrictor is defined between interengaging parts of said first and second valve members.

3. A braking system as claimed in claim 1, wherein said first valve member includes a valve head, and said second valve member is provided with a seating with which said head is engageable, said seating being provided with a diametral scratch or slight notch which defines the restrictor when said head is in engagement with said seating.

4. A braking system as claimed in claim 1, wherein a pump is operative to return fluid displaced from said brake to a line between said source and said modulator on the upstream side of said restrictor.

5. A braking system as claimed in claim 1, including an expander piston and at least one return spring, in which fluid displaced from said brake acts on said expander piston, in turn acting to urge said first valve member into engagement with said second valve member against the force in said return spring.

6. A braking system as claimed in claim 1, wherein said second valve member comprises a spool working in a bore in a housing and a second restriction defined between said spool and said housing is located upstream of said restrictor, movement of said spool relative to said housing to control the size of said second restriction being controlled by the difference in pressure across said restrictor such that an increase in the said pressure difference tends to cause a reduction in the size of said second restriction.

* * * * *